Patented May 15, 1951

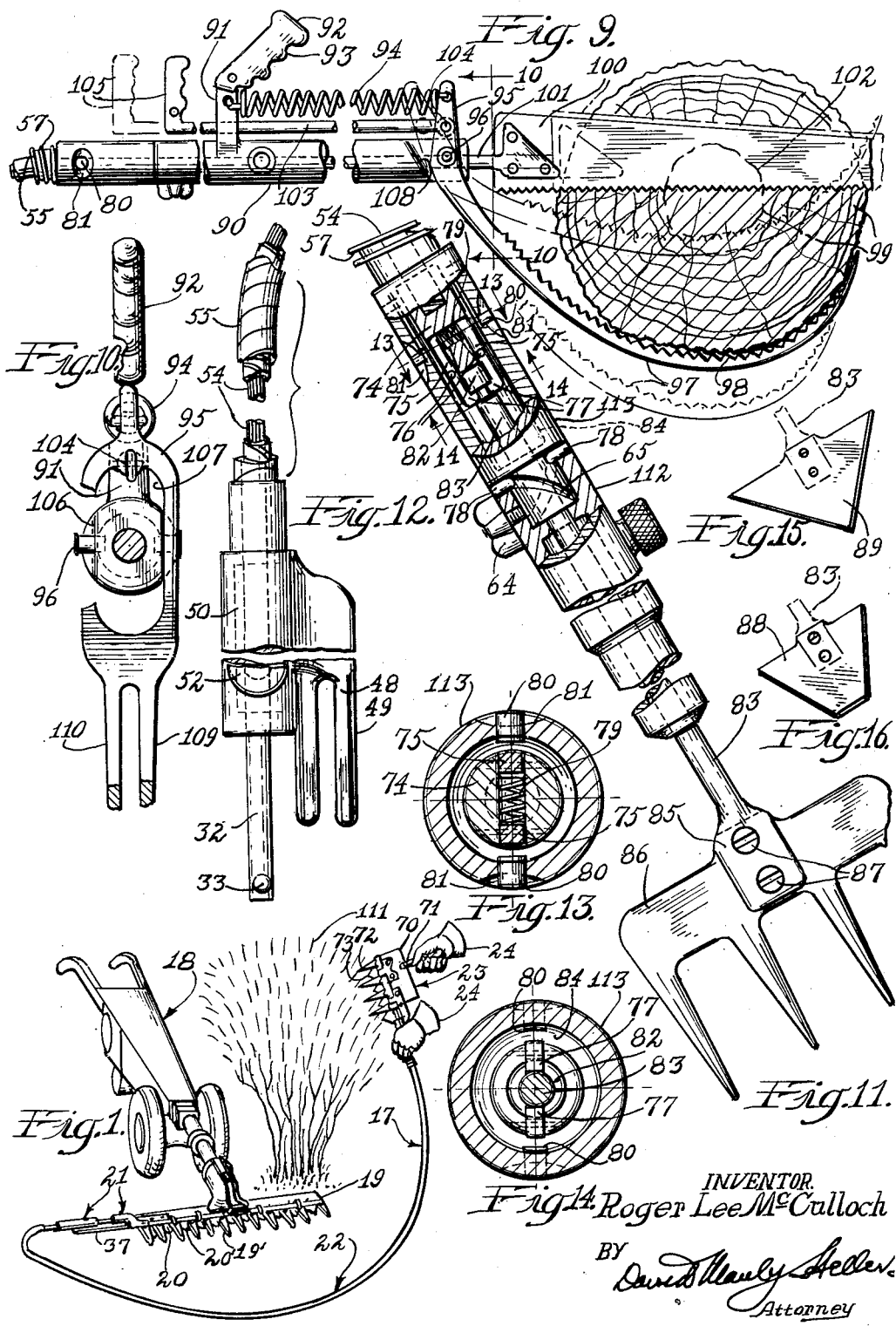

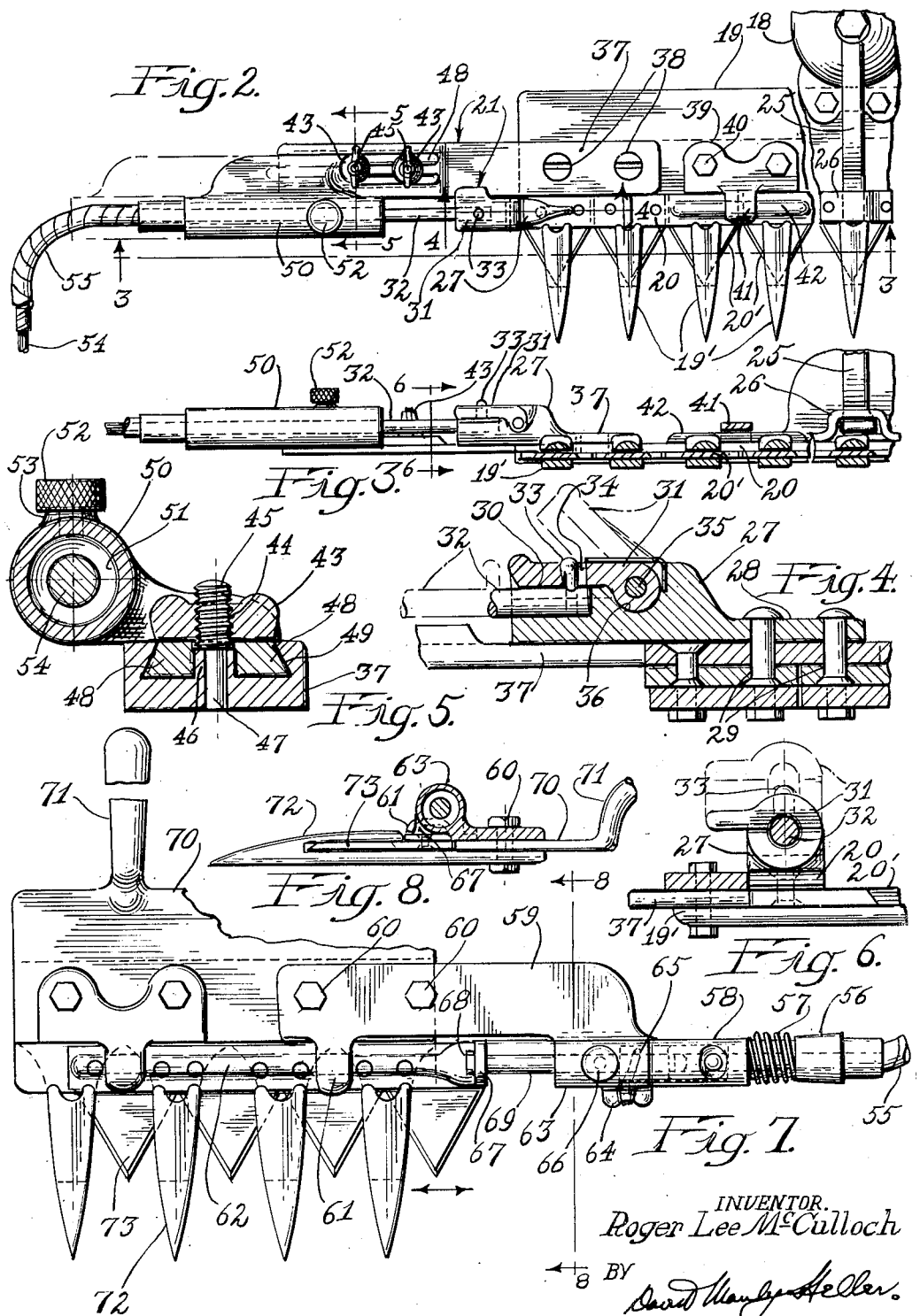

2,553,463

UNITED STATES PATENT OFFICE 2,553,463

REMOVABLY ATTACHABLE FLEXIBLE RECIPROCATING TRANSMISSION AND MEANS FOR REMOVABLY ATTACHING RECIPROCATING TOOLS THERETO

Roger Lee McCulloch, Monmouth, Ill.

Application April 5, 1947, Serial No. 739,588

10 Claims. (Cl. 74—501)

My invention consists of an attachment, or accessory, which will adapt for use various farm tools requiring a reciprocating action, so that the power take-off will be supplied by a power mower or garden tractor.

An important object of my invention is to provide means for harnessing the sickle bar of a garden mower, through a flexible transmission providing reciprocatory action, to a series of garden tools, such as rakes, hoes, a pruning saw, and a hedge-cutting attachment.

An important object of my invention is to provide means for quickly and detachably securing a flexible transmission means to the sickle bar, or to the reciprocating element, of a garden implement.

A further object of my invention is to provide means for quickly attaching, or detaching, a series of tools to the other end, or to the free end, of the said flexible transmission means.

A further object of my invention is to provide, in combination, a means for quickly and detachably, securing a flexible transmission means to a reciprocating element of a machine, in combination with means for quickly and detachably securing to the free end of the said flexible transmission means, a multiplicity of tools which may be interchangeably secured to the said free end of the said transmission means.

A further object of my invention is to provide a pruning attachment which can be manipulated so as to be effective in cutting branches, or for pruning purposes at remote points, yet controllable by the operator at a point within access and easy reach to him.

A further object of my invention is to provide an intermediate flexible reciprocating transmission means, which can be stored away when not in use and yet be quickly and readily attachable when it is desired to use the same.

A further object of my invention is to provide a transmission means in combination with attaching means, as heretofore mentioned, which is simple in construction, practical for the purposes for which it is to be used, and of such simple, elemental construction as to warrant economical manufacture thereof in quantity production.

Other features, objects, and ancillary advantages inherent in my invention will become apparent from an examination of the accompanying drawings, bearing further elucidation in the ensuing description, wherein like symbols are used to designate like parts, and in which:

Fig. 1 is a perspective view showing a garden mower to which my invention is secured.

Fig. 2 is an enlarged top view of that portion of the mower to which the means for attaching the flexible reciprocating transmission is clearly indicated.

Fig. 3 is a view looking in the direction of arrows 3—3 of Fig. 2.

Fig. 4 is a fragmentary, enlarged view of one portion of the attaching means, or of one section of the attaching means, as seen when cut across the sectional lines looking in the direction of the arrows 4—4 of Fig. 2.

Fig. 5 is a cross-sectional view taken substantially on the lines 5—5 of Fig. 2.

Fig. 6 is an end view of Fig. 4, the view being taken as seen from the left of Fig. 4.

Fig. 7 is a top view of the hedge-cutter attachment secured to the flexible transmission.

Fig. 8 is a sectional view taken substantially on the lines 8—8 of Fig. 7, the said view being revolved 90° in order to accommodate the same on the sheet of drawings.

Fig. 9 is a front view of a pruning attachment, a device which may be interchangeably secured to the transmission means comprising my invention.

Fig. 10 is a sectional view taken substantially on the lines 10—10 of Fig. 9.

Fig. 11 is a sectional view of the attaching means for quickly, readily, and detachably securing various tools, or instrumentalities, to the free end of my transmission construction.

Fig. 12 is a top view of Fig. 5 in slightly reduced scale.

Fig. 13 is a sectional view taken substantially on the lines 13—13 of Fig. 11.

Fig. 14 is a sectional view taken substantially on the lines 14—14 of Fig. 11.

Fig. 15 is one form of hoe attachment which may be quickly and detachably secured to function at the free end of my transmission means, and Fig. 16 is a view of another form of hoe attachment which may be used in connection with my transmission structure.

Referring to the various views, in Fig. 1, I indicate in perspective a garden mower, which is generally designated 18, and has a stationary, toothed bar 19 and a reciprocating or movable sickle bar 20, so as to mow a lawn, grass, or similar growth, close to the ground. To these bars 19 and 20, the connecting means, generally designated 21 and comprising a part of my invention, are secured so as to afford the initial connection for providing reciprocatory motion to the flexible, sheathed transmission or shaft, generally designated 22; the free end thereof receiving securably and removably the hedge-cutting attachment 23 for trimming hedges 111. The combination of the interchangeably attachable tools, designated 23, the transmission 22, and the connecting means 21 to the power take-off, or power source of supply, comprises my invention; that combination is generally designated 17.

Thus, it can be seen in Fig. 1 that the hedge-cutter 23 would be operated by holding the end of the transmission 22 in one hand 24, and holding the reciprocating member of the hedge-cutter 23 in the other hand 24 and, with both hands, manipulating the same in accordance with the amount of hedge that is to be trimmed, the device being guided over the various portions of the hedge 111 for trimming as desired.

Referring to Figs. 1-6 inclusive, the structure 21 for initially securing the flexible transmission is indicated. The stationary blade 19 of the mower 18 has secured thereto the fitting or bracket 37 being firmly secured by screws 38, and being permanently located thereon, so as to afford ready attaching means when the transmission and its attachments are to be utilized. Otherwise, the bracket remains permanently attached to the stationary blade 19 and the sickle bar 20. The stationary blade 19 is provided with a series of teeth 19', which are recessed centrally as indicated, in order to accommodate and permit the reciprocatory action of the teeth 20' on the movable sickle bar 20.

It is to be noted that the sickle bar 20 is provided with raised protuberances 42, which are guided in their reciprocatory action within the lugs 41. The lugs 41 are extensions of the brackets 39, the brackets 39 being rigidly secured in place and attached to the stationary bar 19 by means of cap screws 40, or other suitable fastenings. To the sickle bar 20 is attached a U-shaped bracket 26 through the center of which the movable element 25, which is pivotably secured, functions and causes the sickle bar to be reciprocated back and forth inasmuch as the movable element 25 is subjected to a radial, intermittent, and reciprocating movement.

The sheath 55 of the transmission means furnishes a housing for the reciprocating flexible transmission 54, the same extending through to furnish the free end 32 to which the securing pin 33 is attached. The bracket 27 is provided with an extension 28 which is riveted or firmly secured in place by means of rivets 29, and attached to the sickle bar 20. The said bracket 27 is provided with a pocket 36, a hinge pin 35 being driven therethrough in order to hold pivotably the movable closure 31. The closure 31 is provided with an opening 34, so as to lock the pin 33 firmly in place and effectuate security between the movable sickle bar 20, the bracket 27, and the terminus 32 of the flexible shaft 54. The closure 31, by virtue of its lower surface 30, confines the rod 32.

The end 32 passes through the bracket 37, which has a dove-tailed slot 49 therein, in order to accommodate the bifurcated dove-tailed slide 48, which is adapted to fit over the threaded studs 45, the slotted portion 44 fitting thereover. The studs 45 are provided with a reduced extension 47, which may be welded to the bracket 37 or otherwise firmly secured, and extend into the raised section 46 which also furnishes central guidance to the dove-tailed slide 48 so as to firmly secure it in place, and retain it against resultant vibration from the reciprocating action to follow. The bifurcated slide 48 is clamped down firmly in place by wing nuts 43. The slide element 48 is provided with the bearing extension 50, which houses a greasing pocket 51 in order to provide sufficient lubrication for the reciprocating flexible shaft 54. At the upper end of the extension 50, a grease cup 53 is provided and enclosed by the knurled cap 52, which is removed when it is desired to fill the pocket 51 with grease or suitable lubricant.

In Figs. 7 and 8, I show one of the attachments, namely a hedge-cutter, secured to the other end of the transmission means, and it can be seen that the free end of the said transmission means, and on the sheath 55, has connected thereto a chuck 56, a flexible union to a bushing 58, the flexible connection comprising a spring-like structure 57 so as to permit universal manipulation of the hedge-cutter, or other similar instrumentality which may be secured to the bushing 58, at the same time preventing the said flexible portion from being bent to a sharp angle which might result in breakage. To the bushing 58, the hedge-cutter bracket 59 is secured by means of a bayonet joint 65, more clearly exemplified in Fig. 12. A lock-nut 64 securing the same in place and a grease cup 66 provides lubrication at this point, like the one shown at the extension 50 heretofore recited. The bracket 59 has a bushing 63 which is removably secured to the bushing 58 by means of bayonet lock 65.

The hedge-cutter bracket 59 is held in place securely by cap screws 60 to the stationary bar 70 of my hedge-cutter, the same having a handle portion 71 to afford convenient grip to one hand of an operator. The said stationary bar 70 is provided with teeth 72, which are centrally recessed as indicated in Fig. 8, in order to accommodate the teeth 73 of the movable sickle bar therein.

In this case, the hedge-cutter is provided with guiding lips 61 secured to brackets 69 rigidly secured to the stationary bar 70, and projections 62, guided under the said lips 61, for furnishing a true and smooth movement to the sickle bar and proper guidance therefor in its reciprocatory movements. The connection 69 is firmly secured to an ear or lug 67, having an enlarged head 68 of the connecting rod 69 secured thereto, the said head 68 being welded or otherwise firmly secured to the ear 67. Thus, the hedge-cutter may be removed by loosening the wing nut 64, and rotating the hedge-cutter in order to free it from the bayonet lock 65 and also from the locking means, shown in Fig. 12, which consists of a bushing 74 to which the shaft 54 is firmly attached. The said bushing 74 is suitably recessed and slotted to house therein the pivotably movable levers 75 which articulate about the pivot points 76, and have lower extremities or hooks 77 so as to reach under the shoulders formed below the head 82 of the reciprocating shaft 83.

A bushing 112, similar to the part 63, and the bayonet locking means 65 therein which cooperates with the pin 78 is secured to the element 112, and the locking thumb screw 64 for securing the same in place simultaneously with the threading in and locking of the member 112 to the bushing 113. The head 82, when moving inwardly, deflects outwardly the hooks 77 and, after passing them, its bottom shoulder locks against the hooks 77, the same being urged normally in the position, indicated in full lines in Fig. 12, by means of the centrally positioned spring 79; the said spring urging the levers 75 outwardly.

To free the head 82, pins 80 are depressed, in the finger clearance openings 81, so as to spread the hook portions 77 permitting the shaft 83 to be withdrawn from engagement, subsequent to loosening the locking means 64 to free the bayonet locking arrangement 65, so that the tool 86, or the hedge-cutter 59, may be disassembled or removed. In this case, in Fig. 12, I show a rake 86, with suitable tines for purposes for which it is to be used, being secured to the shaft 83 by means of screws 87; the shaft 83 being preferably flattened out, as indicated at 85, in order to furnish rigid security to the rake 86. Shafts similar to shaft 83 may be provided, to which are attached the triangular type of hoe 89, or the trapezoidal type of hoe 88, or the pruning arrangement exemplified and indicated in Figs. 9 and 10. In this case, a tubular section 90 is similarly secured by means of the bayonet lock and the hook levers 75 as heretofore recited. This tubular element 90 may be several feet in length in order to reach limbs on various heights on a tree. The tubular element 90 is provided with lug 91, to which a manipulating or holding handle 92 is secured, having finger notches 93, so that it may be firmly held in the hand to be controlled, and the action of the pruning device rigidly governed in view of its length. The tubular element 90, through its ears 91, has a guide rod 103 which is provided for manipulating the gripping element 97, which is bifurcated and consists of the tines 109 and 110, is of arcuate configuration with teeth 98, as indicated, so as to grip trees 99, or limbs, or branches 102 of various sizes. The same is pivotably secured to the tubular element 90 at 96 terminating in the extension 95 which is also suitably open, as indicated at 107, in order to be firmly secured against the flats 106, terminating at the angular portion 108, limiting the movement of the said tines 109 and 110, so that the crotch therebetween will not strike the saw teeth of the saw 100. The saw 100 is secured to the support 101 which is subjected to reciprocatory movements.

Normally, the bifurcated gripper 97 is urged toward the saw and, in order for it to straddle the diameter of a tree or branch, it is necessary that the same be opened; for this purpose, I provide the guide rod 103 pivotably secured to the extension 95 at 104 and, having a manipulating handle 105, which when pushed inwardly, will cause the bifurcated gripper 97 to be moved outwardly to the full lines indicated; in normal position, being shown in dotted lines. The spring 94, which is anchored to the extension 95 and to the extension 91, urges the said gripper 97 toward the dotted position indicated.

Referring once again to Fig. 12, when the attachment is secured by virtue of the bayonet locking device, heretofore recited, and the locking pawls, or levers 75, the bushing 74 is thus caused to intermittently reciprocate, the pocket 84 affording sufficient clearance for the reciprocating movement of the locking pawls 75 therein, so that the rake or hedge-cutter will be subjected to reciprocatory motion.

The hedge-cutter may be removed by releasing the bayonet locking means and also the lever locking means 75, as heretofore recited, and other instrumentalities secured in its place, or the transmission 22 may be completely removed from assembly with the sickle bar structure 20 and the stationary bar 19 of the garden mower 18, by disconnecting the slide 48 from the bracket 37, and by disconnecting the end 32 of the flexible transmission from the pivotable clamping means 31. The fixtures or brackets 27 and 37 may remain permanently attached, and the garden mower 18 may be used, its use not being impaired by the said brackets remaining attached thereto, nor in any way impeding its efficient function and operation.

I believe that I have herein described, rather succinctly, the nature and the operation as well as the construction and use of my invention, so that those skilled in the art will have no difficulty in grasping the import thereof and, inasmuch as the same is susceptible of modifications, alterations, and improvements, I hereby reserve the right to all modifications, alterations, and improvements coming within the scope and spirit of my invention, as well as any that may be embraced, impliably or suggestively, within the view of the accompanying drawings, and any improvements and modifications that lie within the purview of the foregoing description; my invention to be limited only by the subjoined claims.

Having thus described and revealed my invention, what I claim as new, and desire to secure by Letters Patent, is:

1. In combination, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means.

2. In a device of the character described including, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means.

3. In combination, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means, comprising, bushing means secured to the other end of the said sheath, an adapter bracket, bayonet locking means securing the said adapter bracket to the said bushing means, and spring urged pawl means in the said sheath for releasably attaching the said flexible shaft transmission means to the said reciprocating tool means.

4. In a device of the character described including, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means comprising, bushing means secured to the other end of the said sheath, an adapter bracket, bayonet locking means securing the said adapter bracket to the said bushing means, and spring urged pawl means in the said sheath for releasably attaching the said flexible shaft transmission means to the said reciprocating tool means.

5. In combination, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means comprising, bushing means secured to the other end of the said sheath, an adapter bracket, bayonet locking means securing the said adapter bracket to the said bushing means, and spring urged pawl means in the said sheath for releasably attaching the said flexible shaft transmission means to the said reciprocating tool means, the said reciprocating tool means provided with a head portion releasably engageable by the said pawl means.

6. In a device of the character described including, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means comprising, bushing means secured to the other end of the said sheath, an adapter bracket, bayonet locking means securing the said adapter bracket to the said bushing means, and spring urged pawl means in the said sheath for releasably attaching the said flexible shaft transmission means to the said reciprocating tool means, the said reciprocating tool means provided with a head portion releasably engageable by the said pawl means.

7. In combination, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means comprising, bushing means secured to the other end of the said sheath, an adapter bracket, bayonet locking means securing the said adapter bracket to the said bushing means, and spring urged pawl means in the said sheath for releasably attaching the said flexible shaft transmission means to the said reciprocating tool means, the said reciprocating tool means provided with a head portion releasably engageable by the said pawl means, and means for releasing the said head portion from engagement by the said pawl means.

8. In a device of the character described including, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means comprising, bushing means secured to the other end of said sheath, an adapter bracket, bayonet locking means securing the said adapter bracket to the said bushing means, and spring urged pawl means in the said sheath for releasably attaching the said flexible shaft transmission means to the said reciprocating tool means, the said reciprocating tool means provided with a head portion releasably engageable by the said pawl means, and means for releasing the said head portion from engagement by the said pawl means.

9. In combination, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means comprising, bushing means secured to the other end of the said sheath, an adapter bracket, bayonet locking means securing the said adapter bracket to the said bushing means, and spring urged pawl means in the said sheath for releasably attaching the said flexible shaft transmission means to the said reciprocating tool means, the said reciprocating tool means provided with a head portion releasably engageable by the said pawl means, and means for releasing the said head portion from engagement by the said pawl means, the said bayonet locking means and the said spring urged pawl means being constructed and arranged to function simultaneously.

10. In a device of the character described including, reciprocating means consisting of a stationary element and a reciprocating element, flexible shaft transmission means encased in a sheath, bracket means securing one end of the said sheath to the said stationary element, bracket connecting means removably securing one end of the said flexible shaft transmission means to the said reciprocating element, reciprocating tool means removably attachable to the free end of the said flexible shaft transmission means, and means for removably and interchangeably securing the said reciprocating tool means to the said flexible shaft transmission means, the said last mentioned means comprising, bushing means secured to the other end of the said sheath, an adapter bracket, bayonet locking means securing the said adapter bracket to the said bushing means, and spring urged pawl means in the said sheath for releasably attaching the said flexible shaft transmission means to the said reciprocating tool means, the said reciprocating tool means provided with a head portion releasably engageable by the said pawl means, and means for releasing the said head portion from engagement by the said pawl means, the said bayonet locking means and the said spring urged pawl means being constructed and arranged to function simultaneously.

ROGER LEE McCULLOCH.

REFERENCES CITED

The following references are of record in the file of this patent:

UNITED STATES PATENTS

| Number | Name | Date |
|---|---|---|
| 1,841,008 | Burn | Jan. 12, 1932 |
| 2,027,755 | Szal | Jan. 14, 1936 |
| 2,145,161 | Douglas | Jan. 24, 1939 |
| 2,202,860 | McPhee et al. | June 4, 1940 |
| 2,210,733 | Schmid et al. | Aug. 6, 1940 |
| 2,220,382 | Zimmerman | Nov. 5, 1940 |
| 2,284,517 | Fink | May 26, 1942 |
| 2,369,512 | Zahodiakin | Feb. 13, 1945 |